US010230478B2

(12) United States Patent
Wang et al.

(10) Patent No.: US 10,230,478 B2
(45) Date of Patent: Mar. 12, 2019

(54) SYSTEM FOR INTERFERENCE CANCELLATION AND METHOD THEREOF (71) Applicant: REALTEK SEMICONDUCTOR CORP., Hsinchu (TW)

(72) Inventors: Wu-Chi Wang, Hsinchu (TW); Yuan-Shuo Chang, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 118 days.

(21) Appl. No.: 15/465,933

(22) Filed: Mar. 22, 2017

(65) Prior Publication Data
US 2017/0373764 A1    Dec. 28, 2017

(30) Foreign Application Priority Data

Jun. 24, 2016  (TW) .............................. 105119926 A (51) Int. Cl.
*H04W 4/80* (2018.01)
*H04B 1/525* (2015.01)
*H04B 15/00* (2006.01)
*H04L 25/02* (2006.01)
*H04L 25/03* (2006.01)
*H04W 84/12* (2009.01)

(52) U.S. Cl.
CPC ............ *H04B 15/00* (2013.01); *H04B 1/525* (2013.01); *H04L 25/0202* (2013.01); *H04L 25/03006* (2013.01); *H04W 4/80* (2018.02); *H04W 84/12* (2013.01)

(58) Field of Classification Search
CPC .......... H04B 1/525; H04B 1/109; H04B 1/30; H04B 15/04; H04B 1/0475; H04B 2001/0441; H04B 2001/0491; H04B 2215/065; H04L 5/0023; H04L 1/0083; H04L 27/2636; H04L 27/366; H04L 5/0005; H04L 5/001; H04L 5/0039; H04L 5/0096; H04L 5/1461
See application file for complete search history.

(56) References Cited

U.S. PATENT DOCUMENTS

| 8,792,598 B1* | 7/2014 | Cendrillon | H04B 1/109 375/346 |
| 2010/0159837 A1* | 6/2010 | Dent | H04B 1/525 455/63.1 |
| 2010/0316089 A1* | 12/2010 | Liu | H04B 15/04 375/133 |

(Continued)

*Primary Examiner* — Golam Sorowar
(74) *Attorney, Agent, or Firm* — Li & Cai Intellectual Property (USA) Office (57) ABSTRACT

The invention relates to a system for interference cancellation and method thereof. The system includes a receiver, a transmitter, and a channel estimating and equalizing device. The transmitter and the receiver use different wireless communication technologies to transmit and receive data. The channel estimating and equalizing device can estimate the channel between the transmitter and the receiver for interference cancellation. The embodiments of the invention provide a system and a method thereof for reducing interferences generated when using one wireless communication technology to transmit signals but using another wireless communication technology to receive signals by using digital baseband signals.

17 Claims, 8 Drawing Sheets

(56) References Cited

U.S. PATENT DOCUMENTS

2012/0140860 A1\* 6/2012 Rimini .................. H04B 1/525
 375/350
2013/0044791 A1\* 2/2013 Rimini .................. H04B 1/109
 375/219
2013/0051212 A1\* 2/2013 Suzuki ................ H04B 1/0475
 370/210

\* cited by examiner

SYSTEM FOR INTERFERENCE CANCELLATION AND METHOD THEREOF

BACKGROUND OF THE INVENTION

1. Field of the Invention

The instant disclosure relates to a system and a method for cancelling interferences during the signal transmission; in particular, to a system and a method for cancelling interferences during wireless communication signal transmission.

2. Description of Related Art

The commonly used wireless communication technologies comprise the Long Term Evolution (LTE) technology of the fourth generation (4G) of the mobile phone mobile communication technology, the WCDMA system of the third generation (3G) of mobile phone mobile communication technology, the Global System for Mobile Communications (GSM) system or the CDMA system of the second generation (2G) of the mobile phone mobile communication technology, the Wireless Local Area Networks (such as Wi-Fi), Bluetooth (BT) technology and the like. When a wireless communication device transmits and receives data by using heterogeneous wireless communication technologies through different bandwidths, there may be interferences. For example, the Bluetooth signal transmission may influence the Wi-Fi signal reception.

Therefore, to reduce the interferences described above, currently there are two kinds of solutions. One is to make the bandwidths for signal transmission and signal reception separated more to make it hard for them to be affected by the interference from each other. The other one is to transmit signals and receive signals at different timings to make it hard for them to be affected by the interference from each other. However, these two solutions still have some disadvantages, such as the decrease of the system throughput and the waste of frequency bandwidth.

SUMMARY OF THE INVENTION

The instant disclosure provides a method and a system for interference cancellation, which can effectively reduce interferences generated when using heterogeneous wireless communication technologies to transmit and receive signals.

The system for interference cancellation provided by the instant disclosure comprises a receiver, a transmitter and a channel estimating and equalizing device. The receiver receives a first RF signal and transfers the first RF signal to a first baseband signal. The first baseband signal comprises an effective signal and an ineffective signal. The transmitter transfers a second baseband signal to a second RF signal and transmits the second RF signal. The ineffective signal is generated by inputting the second RF signal to the first channel. The channel estimating and equalizing device generates and adjusts the second channel according to the first channel, calculates a delay time of the ineffective signal, and subtracts a third baseband signal from the first baseband signal to reduce the ineffective signal in the first baseband signal. A third baseband signal is generated by inputting the second baseband signal to the second channel.

To sum up, in the method and the system for interference cancellation provided by the instant disclosure, according to a third baseband signal obtained by inputting a second baseband signal to a second channel, the channel estimating and equalizing device can evaluate an ineffective signal generated when the second baseband signal is inputted to the first channel. After a receiver receives an effective signal and the ineffective signal obtained by inputting the second RF signal to the first channel, the channel estimating and equalizing device can obtain the wanted effective signal by subtracting the ineffective signal from the first baseband signal.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements and signals, but these elements and signals should not be limited by these terms. These terms are only to distinguish one element/signal from another element/signal. As used herein, the term "and/or" includes any and all combinations of one or more of the associated listed items.

Figure 1:
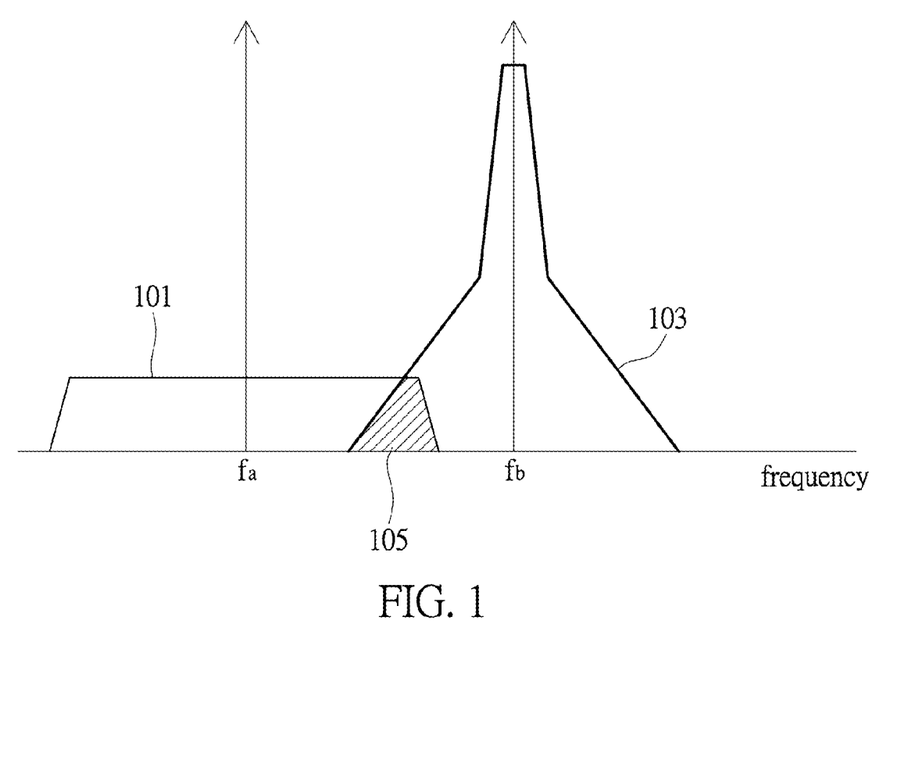
FIG. 1 is a schematic diagram showing that the transmission frequency band of the first transmitter affects the reception frequency band of the second receiver.

Referring to FIG. 1, FIG. 1 is a schematic diagram showing that the transmission frequency band of the first transmitter affects the reception frequency band of the second receiver. As shown in FIG. 1, the first transmitter transmits a first signal in a first frequency band 103 and the first signal has a first frequency fb as its central frequency. The second receiver receives a second signal in a second frequency band 101 and the second signal has a second frequency fa as its central frequency. The first transmitter and the second receiver operate at adjacent frequency bands, so there may be an interference signal 105, generated when transmitting the first signal, and this interference signal 105 directly or indirectly affects the second signal received by the second receiver. In other words, signal distortion may happen to the second signal received by the second receiver, because the second receiver also receives the interference signal 105 generated when the first transmitter transmits the first signal.

The system and method for interference cancellation provided by the instant disclosure can reduce the interference signal 105 generated when the first transmitter transmits the first signal. The instant disclosure can be adapted to many kinds of wireless communication devices related to the Long Term Evolution (LTE) technology of the fourth generation (4G) of the mobile phone mobile communication technology, the WCDMA system of the third generation (3G) of mobile phone mobile communication technology, the Global System for Mobile Communications (GSM) system or the CDMA system of the second generation (2G) of the mobile phone mobile communication technology, the Wireless Local Area Networks (such as Wi-Fi), the Bluetooth (BT) technology and the like, but it is not limited herein.

Figure 2:
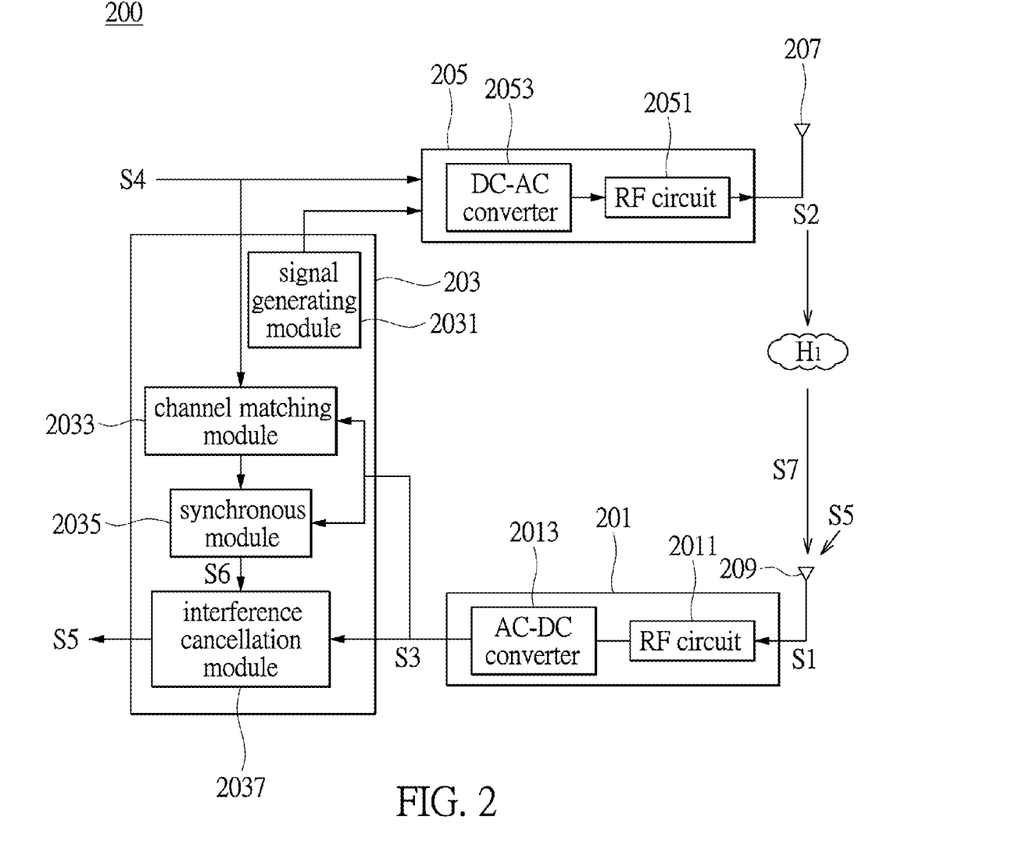
FIG. 2 is a block diagram of a system for interference cancellation of one embodiment of the instant disclosure.

Referring to FIG. 2, FIG. 2 is a block diagram of a system for interference cancellation of one embodiment of the instant disclosure. The system 200 for interference cancellation in this embodiment is for illustrating but not for restricting the instant disclosure. As shown in FIG. 2, the system 200 for interference cancellation comprises a receiver 201 using a first wireless communication technology, a transmitter 205 using a second wireless communication technology and a channel estimating and equalizing device 203. The system 200 for interference cancellation may comprise more elements or less elements. The system 200 for interference cancellation can be used in a wireless communication device, such as a smart phone, a tablet, a laptop or the like. The wireless communication device can transmit and receive data (including the voice communication) by using the first wireless communication technology and the second wireless communication technology. The first wireless communication technology and the second wireless communication technology can be any two of the Long Term Evolution (LTE) technology of the fourth generation (4G) of the mobile phone mobile communication technology, the WCDMA system of the third generation (3G) of mobile phone mobile communication technology, the Global System for Mobile Communications (GSM) system or the CDMA system of the second generation (2G) of the mobile phone mobile communication technology, the Wireless Local Area Networks (such as Wi-Fi), and the Bluetooth (BT) technology.

In one embodiment, the wireless communication device can use both of the first wireless communication technology and the second wireless communication technology to transmit and receive data. In this case, the signal transmitted by using the second wireless communication technology may affect the signal received by using the first wireless communication technology, and vice versa. The system 200 for interference cancellation is used to reduce the interferences that the signal transmitted by using the second wireless communication technology brings to the signal received by using the first wireless communication technology, and vice versa. For easy understanding, the following description only illustrates how to reduce the interferences that the transmitter 205 using the second wireless communication technology brings to the receiver 201 using the first wireless communication technology. In addition, in the following description, the first wireless communication technology is the wireless local area network (WLAN), and the second wireless communication technology is the Bluetooth communication technology, but it is not limited herein. Moreover, the frequency bands of the WLAN and the Bluetooth communication technology are both 2.4 GHz, so the frequency band of the RF signal of the WLAN and the frequency band of the RF signal of the Bluetooth communication technology will be partly or entirely overlapped.

As shown in FIG. 2, the receiver 201 using the WLAN is coupled to an antenna 209, and the antenna 209 is used to receive the RF signal. In one embodiment, the WLAN receiver 201 comprises a RF circuit 2011 and an AC-DC converter (ADC) 2013. The first RF signal S1 is received by the RF circuit 2011 through the antenna 209. The central frequency of the first RF signal S1 is down converted by the RF circuit 2011 to generate a first baseband signal S3. The ADC 2013 converts the first baseband signal S3 from an analog signal to a digital signal. Depending on need, the elements in the WLAN receiver 201 can be added.

Again referring to FIG. 2, the transmitter 205 is coupled to an antenna 207, and the antenna 207 is used to transmit the RF signal. In one embodiment, the transmitter 205 using the Bluetooth communication technology comprises a RF circuit 2051 and a DC-AC converter (DAC) 2053, wherein the DAC 2053 converts a second baseband signal S4 from a digital signal to an analog signal. The central frequency of the second baseband signal S4 is up converted by the RF circuit 2051 to generate a second RF signal S2. The second RF signal S2 is transmitted through the antenna 207. The second baseband signal S4 is an interference signal that may affect the WLAN. Depending on need, the elements in the transmitter 205 using the Bluetooth communication technology can be added.

The channel estimating and equalizing device 203 is connected to the receiver 201 and the transmitter 205. In one embodiment, the channel estimating and equalizing device 203 comprises a signal generating module 2031, a channel matching module 2033, a synchronous module 2035 and an interference cancellation module 2037. In this embodiment, the second baseband signal S4 can be first transmitted to the synchronous module 2035 and then to the channel matching module 2033, but it is not limited herein. Depending on need, the elements in the channel estimating and equalizing device 203 can be added. For example, the channel estimating and equalizing device 203 may not comprise the interference cancellation module 2037.

Figure 3:
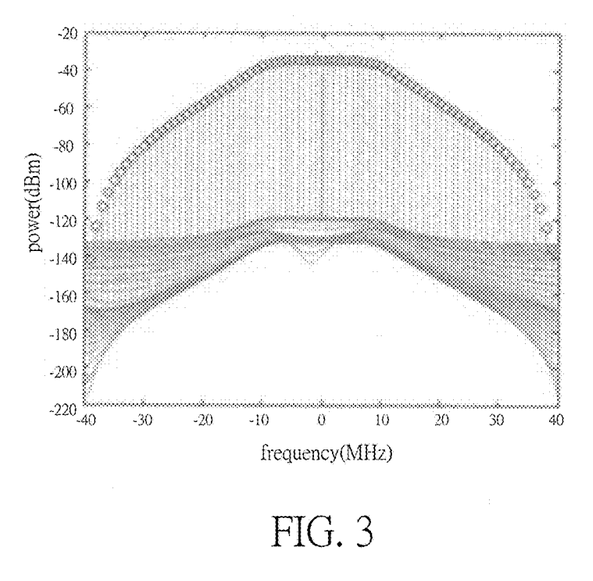
FIG. 3 is a schematic diagram showing that the single-carrier covers the entire frequency band of the third RF signal in one embodiment of the instant disclosure.

In this embodiment, the signal generating module 2031 generates a single-carrier time-domain signal, this single-carrier time-domain signal is transferred to a third RF signal by the transmitter 205, and then the third RF signal is transmitted by the transmitter 205 through the antenna 207. After the third RF signal is inputted to and outputted from the first channel H1, the third RF signal is received by the receiver 201 through the antenna 209. The receiver 201 transfers the received third RF signal to a fourth baseband signal, and the channel matching module 2033 transfers the fourth baseband signal to a frequency-domain signal to obtain its amplitude and phase. According to the amplitude and phase of the frequency-domain signal, the channel matching module 2033 generates a second channel H2 that is similar to the second channel H1. The second channel H2 can thus be adjusted by the variation of the first channel H1. Referring to FIG. 3, FIG. 3 is a schematic diagram showing that the single-carrier covers the entire frequency band of the third RF signal in one embodiment of the instant disclosure.

Figure 5A:
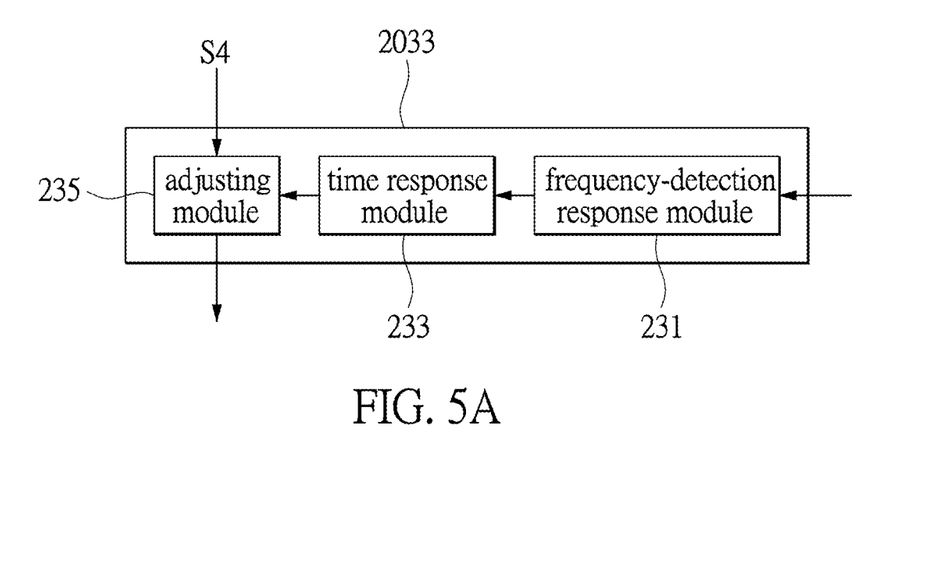
FIG. 5A is a block diagram of a channel matching module of one embodiment of the instant disclosure.

In order to cancel the interference generated when the RF signal is transmitted by the Bluetooth transmitter 205, the single-carrier covers the entire frequency band of the third RF signal. In other words, the band width of the Bluetooth frequency band is about 80 MHz, so that the channel estimating and equalizing device can make an overall estimation for the first channel H1. The frequency band covered by the single-carrier can be designed by those skilled in the art, especially when there is a transmitter that uses another wireless communication technology different from the Bluetooth communication technology. Referring to FIG. 5A, FIG. 5A is a block diagram of a channel matching module of one embodiment of the instant disclosure. The channel matching module 2033 comprises a frequency-detection response module 231, a time response module 233 and an adjusting module 235. The frequency-detection response module 231 is used to transfer the fourth baseband signal to a frequency-domain signal to obtain its amplitude and phase. The time response module 233 is used to estimate the first channel H1 according to the above obtained amplitude and phase. The adjusting module 235 adjusts the second channel H2 according to the estimation that the time response module 233 made for the first channel H1. Depending on need, the elements of the channel matching module 2033 can be added or removed. For example, a discrete Fourier transformation module can be added to the channel matching module 2033, which can transfer a time-domain signal to a frequency-domain signal or can transfer a frequency-domain signal to a time-domain signal.

Figure 4A:
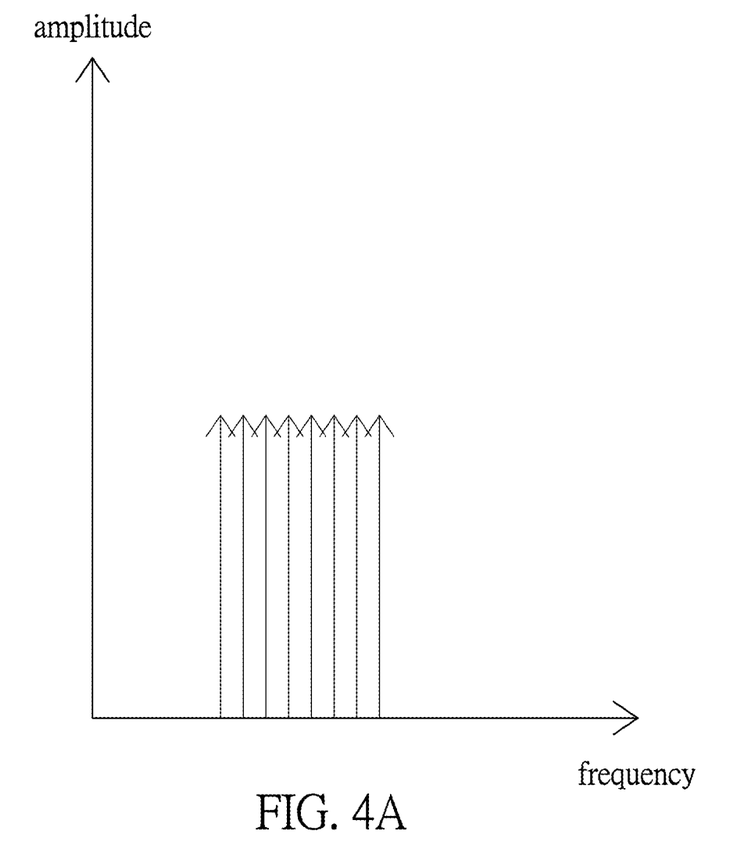
FIG. 4A is a schematic diagram showing the narrow-band multi-carrier in one embodiment of the instant disclosure.
Figure 4B:
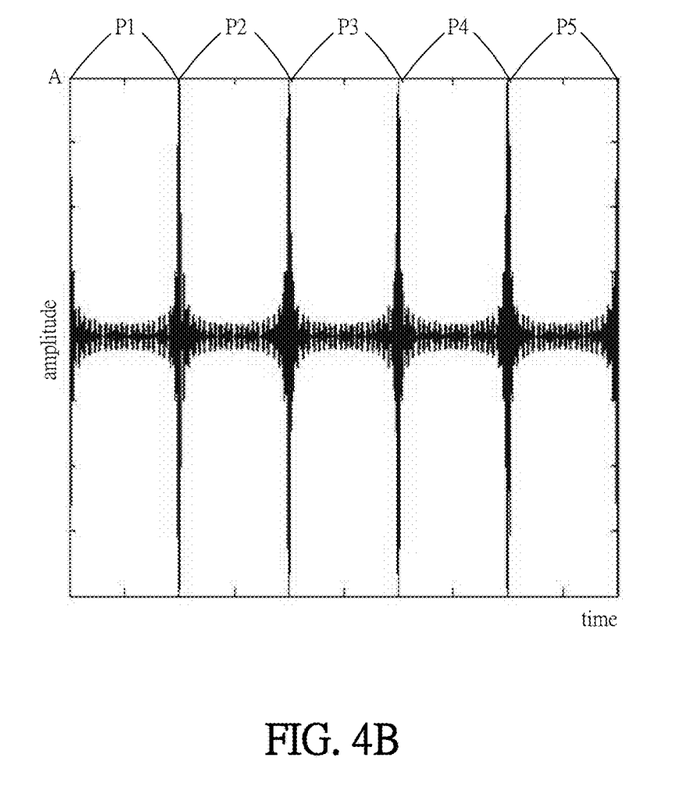
FIG. 4B is a schematic diagram showing the time-domain signal of the narrow-band multi-carrier in one embodiment of the instant disclosure.
Figure 4C:
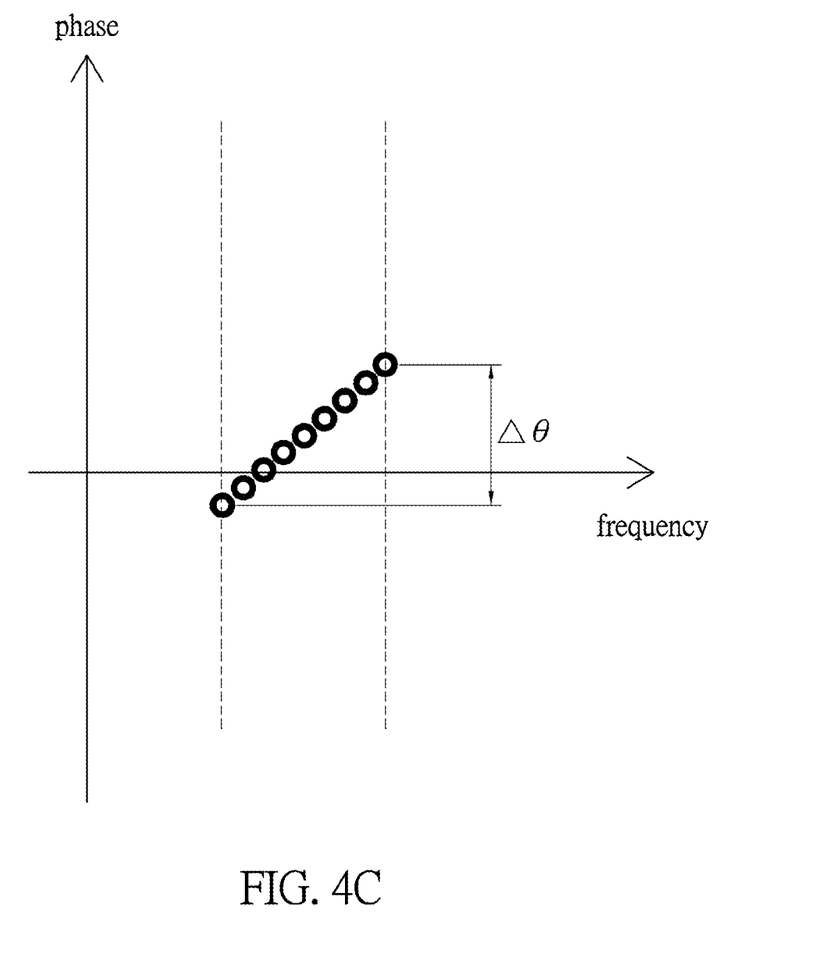
FIG. 4C is a schematic diagram showing how to obtain the phase shift from the frequency-domain signal in one embodiment of the instant disclosure.

In this embodiment, the signal generating module 2031 generates a narrow-band multi-carrier time-domain signal. Likewise, depending on need the elements of the signal generating module 2031 can be added or removed. For example, a single-carrier generator and/or a multi-carrier generator can be added to the signal generating module 2031, wherein the single-carrier generator can generate the single-carrier time-domain signal, and the multi-carrier generator can generate the narrow-band multi-carrier time-domain signal. Referring to FIG. 4A, FIG. 4A is a schematic diagram showing the narrow-band multi-carrier in one embodiment of the instant disclosure. The frequency bandwidth of the RF signal of the Bluetooth transmitter 205 is only 1 MHz-2 MHz, so it is assumed that the frequency bandwidth of the narrow-band multi-carrier is also 1 MHz-2 MHz. However, if the transmitter 205 uses other wireless communication technology, the frequency bandwidth of the narrow-band multi-carrier can have a different design. Referring to FIG. 4B, FIG. 4B is a schematic diagram showing the time-domain signal of the narrow-band multi-carrier in one embodiment of the instant disclosure. The transmitter 205 transfers the narrow-band multi-carrier time-domain signal to a fourth RF signal by the transmitter 205, and transmits the fourth RF signal through the antenna 207. After the fourth RF signal is inputted to and outputted from the first channel H1, the fourth RF signal is received by the WLAN receiver 201 through the antenna 209. After that, the WLAN receiver 201 transfers the received fourth RF signal to a fifth baseband signal. The fifth baseband signal received by the synchronous module 2035 is a periodic baseband signal having periods P1, P2, P3, P4 and P5 as shown in FIG. 4B. It should be noted that, the period and the waveform of the above received baseband signal are not limited herein. In other words, the narrow-band multi-carrier time-domain signal can be designed by those skilled in the art depending on need. In this embodiment, the synchronous module 2035 extracts a periodic signal P1 from the fifth baseband signal, wherein the extracted periodic signal P1 has a maximum peak value at its starting point A. After that, the synchronous module 2035 transfers the periodic signal P1 to a frequency-domain signal. Thus, the synchronous module 2035 can obtain the phase shift $\Delta\theta$ of the periodic signal P1 from its frequency-domain signal, as shown in FIG. 4C. Finally, the synchronous module 2035 calculates a delay time $\tau$ according to the phase shift $\Delta\theta$ of the periodic signal P1 and/or the frequency bandwidth of the narrow-band multi-carrier. The delay times is generated when the narrow-band multi-carrier time-domain signal is transmitted from the Bluetooth transmitter 205, inputted to and outputted from the first channel H1 and finally received by the WLAN receiver 201. It should be noted that, the relationship between the phase shift $\Delta\theta$, the bandwidth $\Delta f$ and the delay time $\tau$ can be described by the following function.

$$\Delta\theta = 2\pi\Delta f\tau$$

Figure 5B:
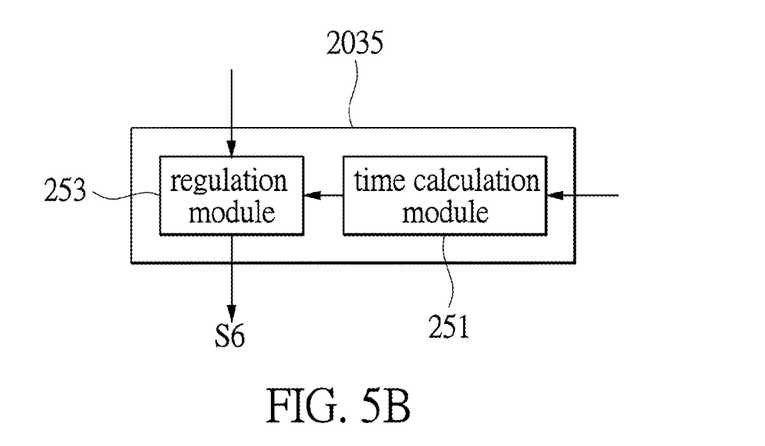
FIG. 5B is a block diagram of a synchronous module of one embodiment of the instant disclosure.

Referring to FIG. 5B, FIG. 5B is a block diagram of a synchronous module of one embodiment of the instant disclosure. The synchronous module 2035 comprises a time calculation module 251 and a regulation module 253. The time calculation module 251 is configured to obtain the phase shift $\Delta\theta$ from the frequency-domain signal and then to calculate the delay time $\tau$ generated when the narrow-band multi-carrier time-domain signal is transmitted by the transmitter 205 to the WLAN receiver 201 through the first channel H1. Because the time calculation module 251 has calculated the delay time $\tau$, it can further determine how many sampling durations Ts there are in the delay time $\tau$. In other words, if the number of the sampling durations Ts in the delay time $\tau$ is "x", and "x" equals=round($\tau$/Ts), wherein the 1/Ts is the sampling rate. After that, the time calculation module 251 stores the number of the sampling durations Ts in the delay time $\tau$ in the regulation module 253, so that the regulation module 253 can delay signal according to the number of the sampling durations Ts in the delay time $\tau$. Depending on need, elements of the channel matching module 2035 can be added or removed. For example, a discrete Fourier transformation module can be added to the channel matching module 2035, which can transfer a time-domain signal to a frequency-domain signal or can transfer a frequency-domain signal to a time-domain signal.

The channel estimating and equalizing device 203 generates and adjusts the second channel H2 by evaluating the first channel H1, and calculates the delay time $\tau$ generated when the narrow-band multi-carrier time-domain signal is transmitted by the transmitter 205 to the WLAN receiver 201 through the first channel H1. The channel estimating and equalizing device 203 performs a convolution operation for the second baseband signal S4 and the second channel H2, and then generates a third baseband signal S6 according to the delay time $\tau$. The interference cancellation module 2037 of the channel estimating and equalizing device 203 subtracts the third baseband signal S6 from the first baseband signal S3 to obtain the WLAN baseband signal. In another embodiment, the interference cancellation module 2037 is not configured in the channel estimating and equalizing device 203. Instead, the interference cancellation module 2037 receives the first baseband signal S3 from the WLAN receiver 201 and the third baseband signal S6 from the channel estimating and equalizing device 203, and then subtracts the third baseband signal S6 from the first baseband signal S3 to obtain the WLAN baseband signal.

In one embodiment, before the wireless communication device starts to transmit data by using the Bluetooth wireless communication technology and to receive data by using the WALN, the signal generating module 2031 of the channel estimating and equalizing device 203 generates the single-carrier time-domain signal. This single-carrier time-domain signal is transmitted by the Bluetooth transmitter 205 to the WLAN receiver 201 through the first channel H1. After that, the channel matching module 2033 of the channel estimating and equalizing device 203 generates and adjusts the second channel H2 according to the first channel H1. The signal generating module 2031 of the channel estimating and equalizing device 203 generates the narrow-band multi-carrier time-domain signal, and this narrow-band multi-carrier time-domain signal is transmitted by the Bluetooth transmitter 205 to the WLAN receiver 201 through the first channel H1. Then, the synchronous module 2035 of the channel estimating and equalizing device 203 calculates the delay time τ, which is generated when the narrow-band multi-carrier time-domain signal is transmitted by the Bluetooth transmitter 205 to the WLAN receiver 201 through the first channel H1.

When the wireless communication device transmits and receives data respectively by using the Bluetooth wireless communication technology and the WLAN, the second baseband signal S4 may be considered the interference. The second baseband signal S4 is transferred to the second RF signal S2 by the Bluetooth transmitter 205, and then the second RF signal S2 is transmitted by the Bluetooth transmitter 205. The first RF signal S1 comprises the WLAN effective signal S5 and the Bluetooth ineffective signal S7. The Bluetooth ineffective signal S7 is considered a product obtained after the second RF signal S2 is inputted to and outputted from the first channel H1. The WLAN receiver 201 receives the first RF signal S1 and transfers the first RF signal S1 to the first baseband signal S3. The first baseband signal S3 comprises the WLAN effective signal S5 and the Bluetooth ineffective signal S7. The channel estimating and equalizing device 203 performs a convolution operation for the second baseband signal S4 and the second channel H2, and generates the third baseband signal S6 according to the delay time T. The channel estimating and equalizing device 203 subtracts the third baseband signal S6 from the first baseband signal S3 to obtain the WLAN effective signal S5.

Figure 6:
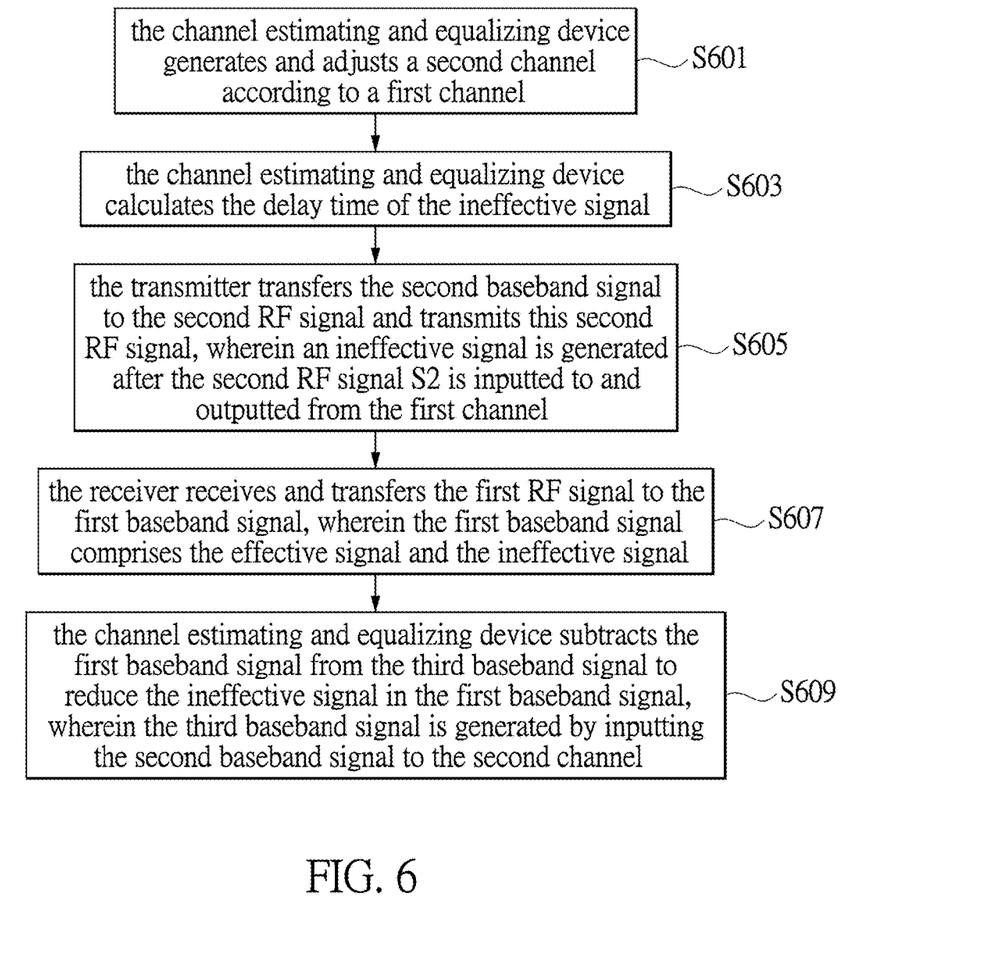
FIG. 6 is a flow chart of a method for interference cancellation of one embodiment of the instant disclosure.

Referring to FIG. 6, FIG. 6 is a flow chart of a method for interference cancellation of one embodiment of the instant disclosure. As shown in FIG. 6, the method for interference cancellation comprises the following steps.

In step S601, the channel estimating and equalizing device 203 generates and adjusts a second channel H2 according to a first channel H1.

In step S603, the channel estimating and equalizing device 203 calculates the delay time of the ineffective signal S7.

In step S605, the Bluetooth transmitter 205 transfers the second baseband signal S4 to the second RF signal S2 and then transmits this second RF signal S2, wherein the second baseband signal S4 is considered the interference for the WLAN. After the second RF signal S2 is inputted to and outputted from the first channel H1, an ineffective signal S7 is generated.

In step S607, the WLAN receiver 201 receives and transfers the first RF signal S1 to the first baseband signal S3. The first baseband signal S3 comprises the effective signal S5 and the ineffective signal S7.

In step S609, the channel estimating and equalizing device 203 subtracts the first baseband signal S3 from the third baseband signal S6 to reduce the ineffective signal S7 in the first baseband signal S3. The third baseband signal S6 is generated by inputting the second baseband signal S4 to the second channel H2.

In another embodiment, the interference cancellation module 2037 is not configured in the channel estimating and equalizing device 203. Thus, instead of executing step S609, the interference cancellation module 2037 receives the first baseband signal S3 from the WLAN receiver 201 and the third baseband signal S6 from the channel estimating and equalizing device 203. Then, the interference cancellation module 2037 subtracts the third baseband signal S6 from the first baseband signal S3 to reduce the ineffective signal S7 in the first baseband signal S3. The third baseband signal S6 is generated by inputting the second baseband signal S4 to the second channel H2.

To sum up, in the method and the system for interference cancellation provided by the instant disclosure, according to a third baseband signal obtained by inputting a second baseband signal to a second channel, the channel estimating and equalizing device can evaluate an ineffective signal generated when the second baseband signal is inputted to the first channel. After a receiver receives an effective signal and the ineffective signal obtained by inputting the second RF signal to the first channel, the channel estimating and equalizing device can obtain the wanted effective signal by subtracting the ineffective signal from the first baseband signal.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A system for interference cancellation, comprising:
a receiver, receiving a first RF signal from a first channel through a first antenna and transferring the first RF signal to a first baseband signal, wherein the first baseband signal comprises an effective signal and an ineffective signal;
a transmitter, transferring a second baseband signal to a second RF signal and transmitting the second RF signal to the first channel through a second antenna, wherein the ineffective signal is obtained by inputting the second RF signal to the first channel; and
a channel estimating and equalizing device, subtracting a third baseband signal from the first baseband signal to reduce the ineffective signal in the first baseband signal, wherein the channel estimating and equalizing device generates and adjusts a second channel according to the first channel, and the third baseband signal is obtained by inputting the second baseband signal to the second channel, wherein the second channel is similar to the first channel;
wherein the channel estimating and equalizing device calculates a delay time of the ineffective signal;
wherein the channel estimating and equalizing device comprises:
a signal generating module; and
a channel matching module;
wherein the channel estimating and equalizing device generates and adjusts the second channel according to the first channel, wherein:
the signal generating module generates a single-carrier time-domain signal;
by the transmitter, the single-carrier time-domain signal is transferred to a third RF signal, and then transmitted;

the third RF signal is inputted to the first channel and then the outputted third RF signal is received by the receiver;

the third RF signal is transferred to a fourth baseband signal by the receiver;

the channel matching module transfers the fourth baseband signal to obtain an amplitude and a phase of the fourth baseband signal in the frequency domain; and the channel estimating and equalizing device adjusts the second channel according to the amplitude and the phase of the fourth baseband signal in the frequency domain.

2. The system for interference cancellation according to claim 1, wherein the signal transmission and the signal reception between the receiver and the transmitter is based on heterogeneous wireless communication technologies.

3. The system for interference cancellation according to claim 2, wherein the receiver is a WLAN receiver and the ineffective signal is a Bluetooth ineffective signal.

4. The system for interference cancellation according to claim 1, wherein the frequency band of the first RF signal and the frequency band of the second RF signal are entirely overlapped or partially overlapped.

5. The system for interference cancellation according to claim 1, wherein the single-carrier time-domain signal includes an entire frequency band of the third RF signal.

6. The system for interference cancellation according to claim 1, wherein the channel estimating and equalizing device further comprises:

a synchronous module;

wherein the channel estimating and equalizing device calculates a delay time of the ineffective signal, wherein:

the signal generating module generates a narrow-band multi-carrier time-domain signal;

by the transmitter, the narrow-band multi-carrier time-domain signal is transferred to a fourth RF signal and then the fourth RF signal is transmitted;

the fourth RF signal is inputted to the first channel and then is received by the receiver;

the receiver transfers the fourth RF signal to a fifth baseband signal;

the synchronous module extracts a periodic signal from the fifth baseband signal, wherein the extracted periodic signal has a maximum peak value at its starting point;

the synchronous module transfers the periodic signal extracted from the fifth baseband signal to obtain a phase shift of the fifth baseband signal; and the synchronous module calculates a delay time generated when the ineffective signal is transmitted from the transmitter to the receiver according to the phase shift of the fifth baseband signal.

7. The system for interference cancellation according to claim 6, wherein the channel estimating and equalizing device calculates the delay time generated when the ineffective signal is transmitted from the transmitter to the receiver according to the frequency band of the narrow-band multi-carrier time-domain signal.

8. The system for interference cancellation according to claim 6, wherein the transmitter comprises:

a DC-AC converter, converting the second baseband signal to an analog second baseband signal; and an RF circuit, up converting a central frequency of the second baseband signal to generate the second RF signal and transmitting the second RF signal.

9. The system for interference cancellation according to claim 1, wherein the receiver comprises:

an RF circuit, receiving the first RF signal, and down converting a central frequency of the first RF signal to generate the first baseband signal; and an AC-DC converter, converting the first baseband signal to a digital first baseband signal.

10. A method for interference cancellation, executed by a system for interference cancellation, comprising:

generating and adjusting a second channel according to a first channel by a channel estimating and equalizing device;

calculating a delay time of an ineffective signal by the channel estimating and equalizing device;

receiving a first RF signal from the first channel through a first antenna and transferring the first RF signal to a first baseband signal by a receiver, wherein the first baseband signal comprises an effective signal and the ineffective signal, the ineffective signal is generated by inputting a second RF signal to the first channel through a second antenna, and the second RF signal is generated by up converting a second baseband signal; and subtracting a third baseband signal from the first baseband signal to reduce the ineffective signal in the first baseband signal by the channel estimating and equalizing device, wherein the third baseband signal is generated by inputting the second baseband signal to the second channel, wherein the second channel is similar to the first channel;

wherein when the channel estimating and equalizing device generates and adjusts the second channel according to the first channel, the method comprises:

generating a single-carrier time-domain signal by the channel estimating and equalizing device;

by the transmitter, transferring the single-carrier time-domain signal to a third RF signal and transmitting the third RF signal;

inputting the third RF signal to the first channel and receiving the outputted third RF signal by the receiver;

transferring the received third RF signal to a fourth baseband signal by the receiver;

transferring the fourth baseband signal by the channel estimating and equalizing device to obtain an amplitude and a phase of the fourth baseband signal in the frequency domain; and generating and adjusting the second channel by the channel estimating and equalizing device according to the amplitude and the phase of the fourth baseband signal in the frequency domain.

11. The method for interference cancellation according to claim 10, wherein the signal transmission and the signal reception between the receiver and the transmitter is based on heterogeneous wireless communication technologies.

12. The method for interference cancellation according to claim 11, wherein the receiver is a WLAN receiver and the ineffective signal is a Bluetooth ineffective signal.

13. The method for interference cancellation according to claim 10, wherein the frequency band of the first RF signal and the frequency band of the second RF signal are entirely overlapped or partially overlapped.

14. The method for interference cancellation according to claim 10, wherein the single-carrier time-domain signal includes an entire frequency band of the third RF signal.

15. The method for interference cancellation according to claim 10, wherein when the channel estimating and equalizing device calculates the delay time of the ineffective signal, the method comprises:

generating a narrow-band multi-carrier time-domain signal by the channel estimating and equalizing device;

by the transmitter, transferring the narrow-band multi-carrier time-domain signal to a fourth RF signal and transmitting the fourth RF signal;

inputting the fourth RF signal to the first channel, and receiving the outputted fourth RF signal by the receiver;

transferring the received fourth RF signal to a fifth baseband signal by the receiver;

extracting a periodic signal from the fifth baseband signal by the channel estimating and equalizing device, wherein the extracted periodic signal has a maximum peak value at its starting point;

transferring the extracted periodic signal by the channel estimating and equalizing device to obtain the phase shift of the fifth baseband signal; and calculating the delay time generated when the ineffective signal is transmitted from the transmitter to the receiver by the channel estimating and equalizing device according to the phase shift of the fifth baseband signal.

16. The method for interference cancellation according to claim 15, wherein the channel estimating and equalizing device calculates the delay time generated when the ineffective signal is transmitted from the transmitter to the receiver according to the frequency band of the narrow-band multi-carrier time-domain signal.

17. A wireless communication device, having a system for interference cancellation, comprising:

a receiver, receiving a first RF signal from a first channel through a first antenna and transferring the first RF signal to a first baseband signal, wherein the first baseband signal comprises an effective signal and an ineffective signal;

a transmitter, transferring a second baseband signal to a second RF signal and transmitting the second RF signal to the first channel through a second antenna, wherein the ineffective signal is generated by inputting the second RF signal to the first channel; and a channel estimating and equalizing device, subtracting a third baseband signal from the first baseband signal to reduce the ineffective signal in the first baseband signal, wherein the channel estimating and equalizing device generates and adjusts a second channel according to the first channel, and the third baseband signal is generated by inputting the second baseband signal to the second channel, wherein the second channel is similar to the first channel;

wherein the channel estimating and equalizing device calculates a delay time;

wherein the channel estimating and equalizing device comprises:

a signal generating module; and a channel matching module;

wherein the channel estimating and equalizing device generates and adjusts the second channel according to the first channel, wherein:

the signal generating module generates a single-carrier time-domain signal;

by the transmitter, the single-carrier time-domain signal is transferred to a third RF signal, and then transmitted;

the third RF signal is inputted to the first channel and then the outputted third RF signal is received by the receiver;

the third RF signal is transferred to a fourth baseband signal by the receiver;

the channel matching module transfers the fourth baseband signal to obtain an amplitude and a phase of the fourth baseband signal in the frequency domain; and the channel estimating and equalizing device adjusts the second channel according to the amplitude and the phase of the fourth baseband signal in the frequency domain.

* * * * *